Jan. 27, 1970 H. E. TAUSCHER 3,492,627
MATRIX PANEL CONNECTING PIN
Filed Dec. 4, 1967 2 Sheets-Sheet 1

INVENTOR
HEINRICH E. TAUSCHER
by
Mason, Kolehmainen, Rathburn and Wyss
ATTORNEYS

MATRIX PANEL CONNECTING PIN

Filed Dec. 4, 1967 2 Sheets-Sheet 2

INVENTOR
HEINRICH E. TAUSCHER
by Mason, Kolehmainen, Rathburn and Wyss
ATTORNEYS.

United States Patent Office 3,492,627

Patented Jan. 27, 1970

3,492,627

MATRIX PANEL CONNECTING PIN

Heinrich E. Tauscher, Chicago, Ill., assignor to Comtech Corporation, Broadview, Ill., a corporation of Illinois Filed Dec. 4, 1967, Ser. No. 687,665
Int. Cl. H05k *1/00*
U.S. Cl. 339—17 3 Claims

ABSTRACT OF THE DISCLOSURE

A matrix panel connecting pin having opposed flat strip conductive elements each provided with an inwardly directed indentation, the edges of each indentation establishing contact with a pair of spaced apart conductor elements on opposite sides of a panel of insulating material when the pin is inserted into an aperture in the panel which intersects both conductor elements.

The present invention is directed to connecting pins for selectively establishing connection between printed circuit conductors positioned on opposite sides of a printed circuit board. While the invention is of general application, it is particularly suitable for use with, and will be illustrated in connection with a matrix panel wherein it is desirable to establish connections selectively between any one of a first group of conductors and any one of a second group of conductors. Such matrix panels are employed in many types of installations, such as computers, telephone system switching centers, etc. wherein it is desirable selectively to establish different connections between two different banks of conductors in a simple but reliable manner.

Various arrangements have heretofore been proposed for establishing an electrical connection to a desired point on a printed circuit board. When connection is to be established to only one side of the board, a generally tubular pin construction has been employed which has a bifurcated end portion provided with ridges which are spaced apart by an amount equal to the thickness of the printed circuit board. These ridges function to hold the connecting pin in place with a wire attached thereto until the solder dip operation is performed. When connection is to be established between different conductors on opposite sides of the printed circuit board, other arrangements have been proposed which involve generally U-shaped clips which are inserted into apertures in the board and then rotated into engagement with printed circuit conductor portions on both sides of the printed circuit board.

In all of these prior art arrangements, difficulties have been experienced in providing a suitable connecting pin which will establish and maintain good electrical contact between conductors on opposite sides of the printed circuit board while at the same time providing a pin structure which can be readily inserted and removed from the board so that the connections can be selectively changed in any desired manner. It has also been difficult to provide a connecting pin structure which will accommodate printed circuit boards of varying thicknesses and still provide good electrical contact for the desired interconnections on opposite sides of the board.

It is, therefore, an object of the present invention to provide a new and improved connecting pin structure which avoids one or more of the above discussed disadvantages of prior art arrangement.

It is another object of the present invention to provide a new and improved connecting pin structure which may be readily inserted into an aperture in a printed circuit board and establishes and maintains good electrical contact between printed circuit conductors positioned on opposite sides of the board.

It is a further object of the present invention to provide a new and improved connecting pin structure which is adapted to interconnect printed circuit conductors positioned on opposite sides of a printed circuit board and wherein a self-centering action is provided which functions to establish and maintain contact between these conductors at multiple points on each conductor even though the pin is not positioned exactly at the correct point when originally inserted into the board.

It is a still further object of the present invention to provide a new and improved connecting pin structure which is simple and economical in manufacture and which establishes contact between printed circuit conductors on opposite sides of a printed circuit board while accommodating variations in thickness of the board.

Briefly, in accordance with one aspect of the invention, a connecting pin structure is provided having opposed flat strip conductive elements each provided with an inwardly directed indentation, these indentations being positioned along the length of each strip element and being of the correct depth to provide a plurality of sloping contact-making edges, or shoulders, which engage printed circuit conductors positioned on opposite sides of a printed circuit panel when the pin is inserted through an opening in the panel which communicates with both of the printed circuit conductors on opposite sides of the board. The flat strip conductive elements are spring biased against the edges of the openings provided in each printed circuit conductor so as to provide a self-centering action for the connecting pin and to establish multiple point contact between each printed circuit conductor and each of the flat strip conductive elements. The bottom end portions of the flat strip conductive elements are connected together to provide a readily insertable head portion and also to provide sufficient spring bias to maintain good centering action of the pin with respect to the printed circuit board.

The invention, both as to its organization and method of operation, together with further objects and advantages thereof, will best be understood by reference to the following specification taken in connection with the accompanying drawings in which.

Figures 1, 2, 3, 4, 5:
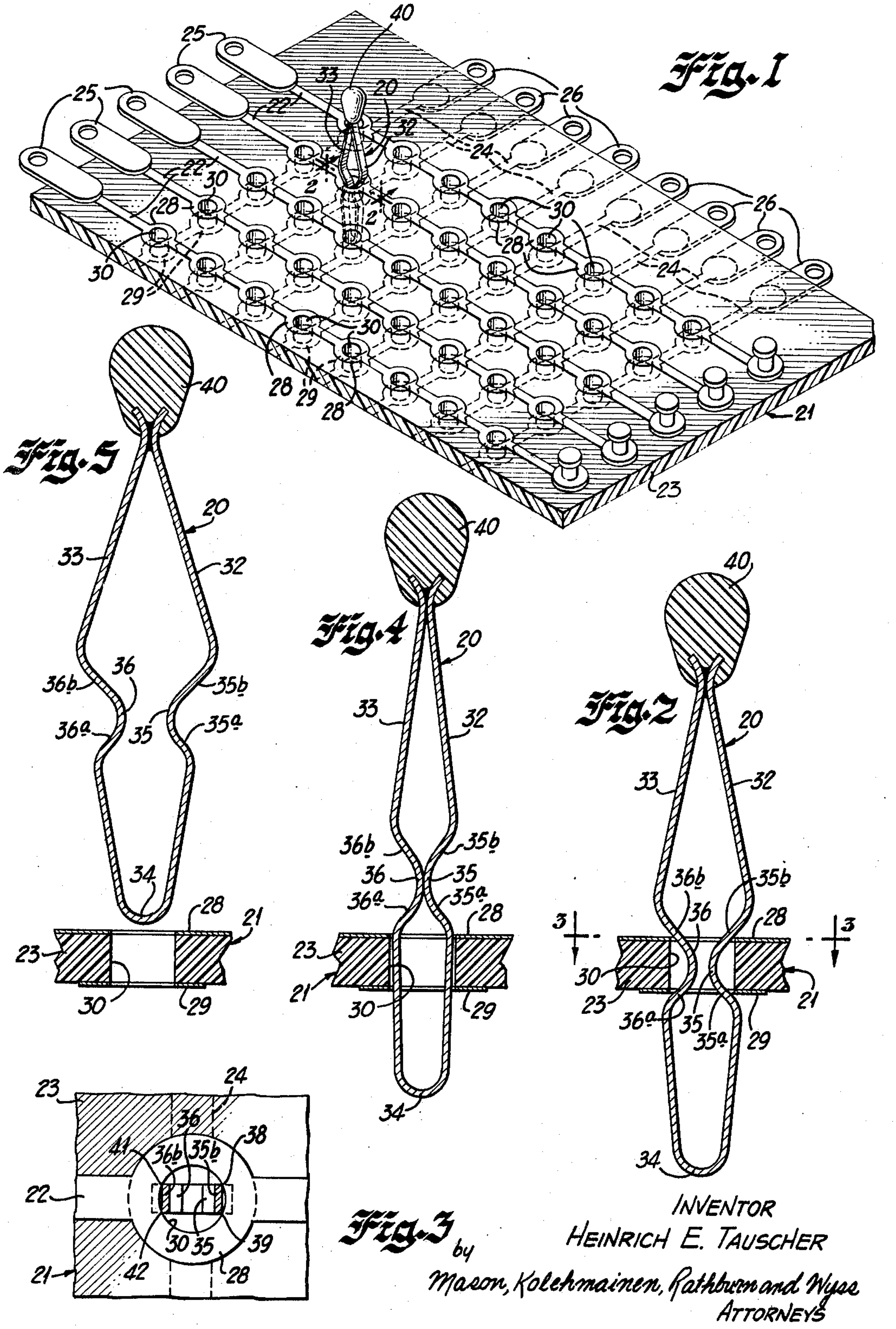
FIG. 1 is a perspective view of a portion of a matrix panel illustrating the manner in which a connecting pin constructed in accordance with the present invention may be utilized.
FIG. 2 is a fragmentary sectional view taken along lines 2—2 of FIG. 1, on a somewhat larger scale, and showing the connecting pin of the present invention inserted into the board.
FIG. 3 is a sectional view taken along lines 3—3 of FIG. 2.
FIGS. 4 and 5 are sectional views similar to FIG. 2 but illustrating different phases of the pin inserting operation.

Referring now to the drawings and more particularly to FIGS. 1 to 5, inclusive, thereof, the present invention is therein illustrated as comprising a connecting pin indicated generally at 20 which is shown in FIG. 1 inserted into a matrix panel indicated generally at 21. The panel 21 is provided with a first series of printed circuit conductors 22 positioned on one side of a base member 23 of insulating material and a series of printed circuit conductors 24 are positioned on the opposite face of the base 23 and extend generally perpendicular to the conductors 22. External electrical connections can be established to the set of conductors 22 by any suitable means such as the terminal members 25 and, similarly, connections to the terminal members 24 may be established by means of the terminals 26.

In the vicinity of the intersections of the conductors 22 and 24, each conductor is provided with an annular area which surrounds an aperture extending through the board 21. More particularly, the conductors 22 are provided with annular portions 28 and the conductors 24 are provided with annular portions 29 on the opposite side of the base 23, an aperture 30 being provided in the base 23 in alignment with the portions 28 and 29 of the two sets of printed circuit conductors. In effect, therefore, the annular portions 28 and 29 define apertures in the respective printed circuit conductors which are aligned with each other and with the aperture 30 in the insulating panel 23 so that a connecting pin may be inserted through these aligned apertures to establish contact between one of the conductors 22 and one of the conductors 24. This interconnection should be by means of a connecting pin which is readily insertable without undue force and yet is retained in its selected position despite vibration and mechanical disturbances while at the same time establishing and maintaining good electrical contact between the two selected conductors on opposite sides of the board 21. To this end, the connecting pin 20 of the present invention includes a pair of flat strip conductive elements 32 and 33 which are joined together at the bottom end thereof by means of a generally U-shaped portion 34 to provide a head portion which is readily insertable into the aperture 30, as best illustrated in FIG. 4. The flat strip elements 32 and 33 are each provided with an inwardly directed indentation or crimp portion 35, 36, respectively. The indentations 35, 36 are of sufficient length along the length of the elements 32, 33, and are of sufficient depth that the sides of these indentations form sloping shoulders **35*a*, 35*b* and 36*a*, 36*b*, which engage edge portions of both of the printed circuit conductors when the head portion 34 has been inserted through the aperture 30 by a predetermined amount. Thus, referring to FIG. 2, when the connecting pin 20 has been inserted into the board 21 by an amount sufficient to bring the indentations 35, 36 into alignment with the board 21, the shoulder 35*b* engages the edge of the printed circuit conductor portion 28 of one of the printed circuit conductors 22 and the shoulder 35*a* engages the adjacent edge of the printed circuit conductor portion 29 of one of the conductors 24 on the opposite side of the board 21. In a similar manner, the shoulder portion 36*b* is urged into engagement with the printed circuit conductor portion 28 on the opposite side of the opening of the aperture 30 and the shoulder 36*a* is urged into engagement with the conductor portion 29** on the opposite side of the board.

In the preferred embodiment of FIGS. 1 to 5, inclusive, the conductive flat strip elements 32 and 33 have a substantial width so that the edges of these elements engage each of the printed circuit conductors positioned on opposite sides of the printed circuit board 21 at several spaced points. More particularly, as best illustrated in FIG. 3, one corner of the shoulder portion **35*b* contacts the printed circuit conductor portion at the point 38 and another corner of the shoulder portion 35*b* contacts the conductor 38 at point 39. In a similar manner, one corner of the shoulder portion 36*b* contacts the printed circuit conductor portion 28 at the point 40 and the other corner of the shoulder portion 36*b* contacts the conductor 28 at the point 41. The two flat strip elements 32, 33, thus establish multiple point contact with the printed circuit conductor portion 28. In a similar manner, the shoulder portions 35*a* and 36*a* contact the printed circuit conductor portion 29 on the opposite side of the board 21** at four spaced points corresponding to corners of these shoulder portions.

The flat strip elements 32, 33 are preferably made of beryllium copper and are suitably formed and hardened so that the corner portions thereof are relatively sharp and bite into the adjacent edges of the printed circuit conductors 28, 29 to establish good electrical contact therewith. Furthermore, as illustrated in FIG. 5, the flat strip portions 32, 33 are initially formed so that the indentations 35, 36 are spaced a considerable distance apart when the members 32, 33 are unstressed. Accordingly, when the pin 20 is inserted into the aperture 30 of the flat strip elements 32, 33 are spring biased outwardly to bring the edges of the shoulder portions **35*a*, 35*b*, 36*a*, 36*b* into good electrical contact with the respective printed circuit conductors 28 and 29. This spring bias has the further advantage of providing a self-centering action to facilitate the establishment and maintaining of good electrical contact to the conductors 28, 29. Thus, if the pin 20 is inserted into the aperture 30 by too great an amount, the shoulders 35*a*, 36*a* function to center the pin 20 so that the above-described eight-point contact is provided between the conductors 28 and 29**.

At the same time, however, the flat strip elements 32, 33 are sufficiently flexible that the pin 20 may be readily inserted into and removed from the board 21 without disturbing the edges of the printed circuit conductors 28 and 29 adjacent the aperture 30. In this connection it will be understood that the printed circuit board 21 is usually formed by laminating copper foil onto the base member 23 and etching or milling away the undesired portions to form the conductors 22, 24. The board is then drilled or punched to provide the apertures 30 and then a suitable contact metal is deposited onto the conductors 22 and 24 by a suitable plating operation. This plating operation tends to build up around the inner edges of the annular printed circuit portions 28 and 29 and this extra deposit of metal facilitates the establishment of good electrical connection between the corners of the shoulders **35*a*, 35*b*** with these printed circuit conductor portions.

In order to provide a suitable means for gripping the connecting pin 20 so that it may be readily inserted into and removed from the board 21, the upper ends of the flat strip elements 32, 33 are embedded in a mass of plastic 40 to provide a convenient arrangement for gripping the pin 20 so that it may be readily forced into or removed from the desired aperture in the board 21. The mass 40 may be conveniently formed by simply dipping the ends of the flat strip members 32, 33 in a viscous plastic and removing the same whereupon a tear-shaped drop 40 is formed, as shown in the drawings.

In FIGS. 6 to 10, inclusive, there is shown an alternative embodiment of the invention, wherein the connecting pin 50 comprises a pair of wire elements 51 and 52. The upper ends of the wire elements 51 and 52 are embedded in a mass of material **53*a* to facilitate insertion and removal of the pin in a manner similar to the embodiment just described. Each of the members 51, 52 is provided with a pair of bends to define intermediate portions 53, 54 extending generally in the form of an X. The bottom portions 55, 56 of the wire elements 51, 52, terminate in a U-shaped end portion 57 which is shaped to facilitate insertion of the pin 50 into an opening 30 in the printed circuit board 21**.

Figures 6, 7, 8, 9, 10, 11, 12, 13, 14:
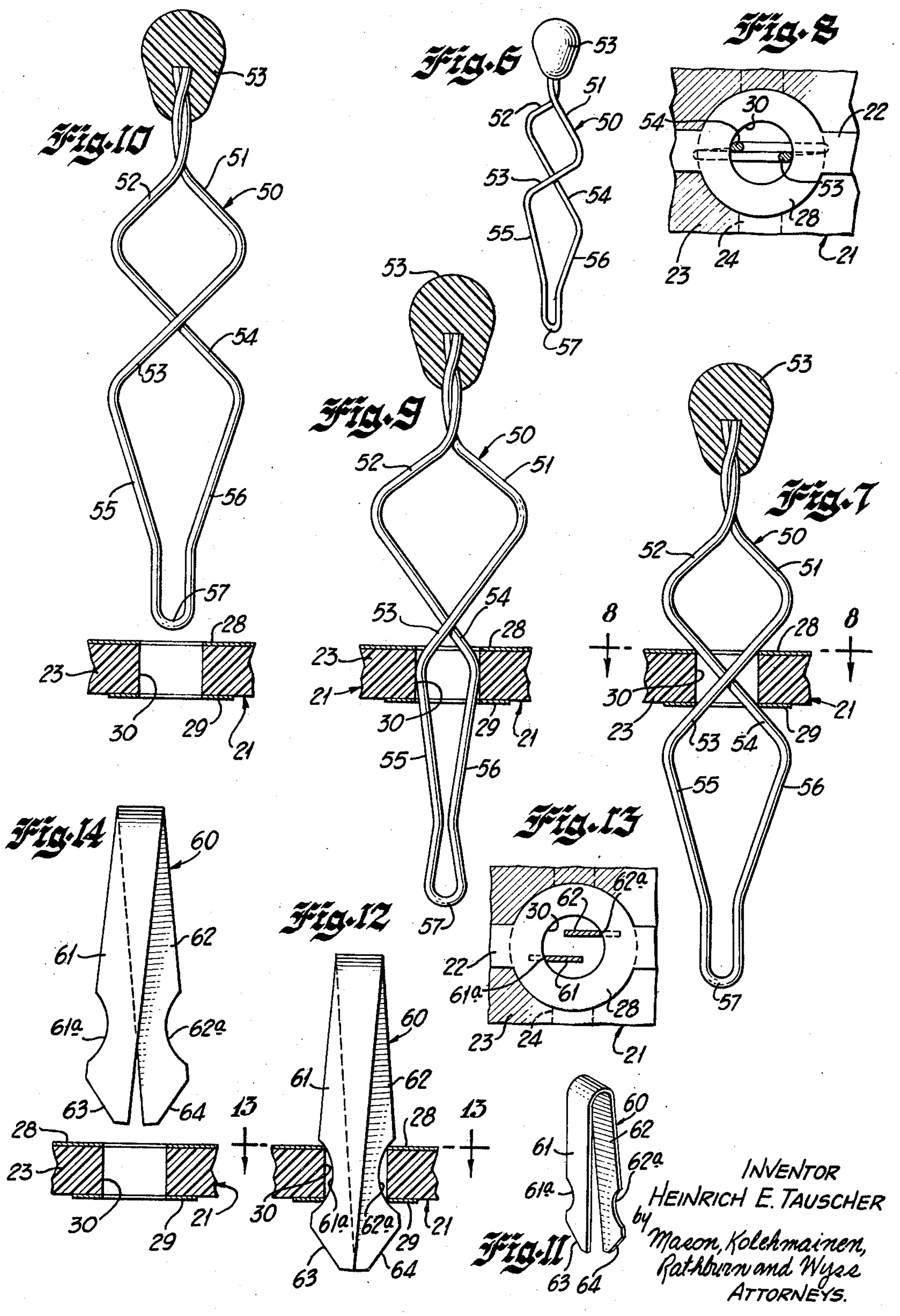
FIG. 6 is a perspective view of an alternative connecting pin construction of the present invention.
FIG. 7 is a sectional view similar to FIG. 2 and showing the pin construction of FIG. 6 inserted into a printed circuit board.
FIG. 8 is a sectional view taken along the line 8—8 of FIG. 7.
FIGS. 9 and 10 are sectional views similar to FIG. 7 and showing different phases of the pin inserting operation using the structure of FIG. 6.
FIG. 11 is a perspective view of a further alternative embodiment of the invention.
FIG. 12 is a sectional view similar to FIG. 2 showing the pin of FIG. 11 inserted into a printed circuit board.
FIG. 13 is a sectional view taken along the lines 13—13 of FIG. 12.
FIG. 14 is a sectional view similar to FIG. 12 but showing the pin of FIG. 11 before it is inserted into the printed circuit board.

As shown in FIG. 9, the elements 55, 56 are substantially compressed toward each other as the pin 50 is inserted into the board 21 and when the pin has been inserted to the amount shown in FIG. 7, the crossed portions 53, 54 are urged outwardly into engagement with the printed circuit conductor portions 28 and 29.

From FIG. 7 it will be evident that the wire portions 53, 54 engage both the printed circuit conductor 28 and the printed circuit conductor 29 at a plurality of points and establish multiple point interconnection between these conductors. However, it is pointed out that the wire elements 53, 54 contact each of the conductors 28, 29 at only one point and hence do not provide as reliable electrical contact between the conductors 28, 29 as the flat strip embodiment of FIGS. 1 to 5, inclusive. On the other hand, the connecting pin 50 may be very economically manufactured, since it involves only a wire bending operation, and hence may be desirable in certain instances where the contact provided by the crossed wire portions 53, 54 is satisfactory.

In FIGS. 11 to 14, inclusive, a further alternative embodiment of the present invention is illustrated. In this embodiment, the connecting pin 60 comprises a flat strip element which is bent in the form of a U to provide arm portions 61 and 62. In the unstressed condition of the pin 60, the arms 61 and 62 are somewhat offset laterally from each other so that indentations **61*a* and 62*a* formed in the lower portion of the arms 61, 62 are spaced relatively far apart. The ends of the arms 61, 62 are provided with inclined shoulders 63 and 64 to facilitate insertion of these end portions into the opening 30 in the printed circuit board 21. When the pin 60 is inserted into the board 21 to the position shown in FIG. 12, the indentations 61*a* and 62*a* are positioned to engage the printed circuit conductor elements 28 and 29 in the manner shown in FIG. 12 and establish electrical connection between these printed circuit conductors. The bias provided by the initial offset spacing of the arms 61, 62 is sufficient to urge the end portions of these elements outwardly and establish electrical cotntact at spaced points along each of the indentations 61, 62 with the respective conductors 28 and 29.**

While there have been illustrated and described various embodiments of the present invention, it will be apparent that various changes and modifications thereof will occur to those skilled in the art.

What is claimed as new and desired to be secured by Letters Patent of the United States is:

1. A matrix panel interconnecting arrangement, comprising a printed circuit board having a base member of insulating material and having conductor elements extending in mutually perpendicular directions on opposite sides of said base member, said base member having openings therein at the intersections of said conductor elements which are aligned with corresponding openings in the intersected conductor elements, a connecting pin for selectively interconnecting a conductor element on one side of said printed circuit board with any one of a number of conductor elements on the opposite side of said board through said aligned openings, comprising an elongated body having a head portion adapted to be inserted into a selected one of said aligned openings in the board and an intermediate portion of reduced cross section which is adapted to be seated in the selected opening, said intermediate portion being compressed when inserted into the opening so that the edges thereof are urged into engagement with the portions of each selected conductor element adjacent the opening to insure that contact is established at a plurality of points between said intermediate portion and each of the selected conductor elements, and a handle portion connected to the upper end of said intermediate portion, whereby said connecting pin may be readily inserted and removed from a selected opening in said board.

2. A matrix panel arrangement as set forth in claim 1, wherein said elongated body comprises a flat strip provided with a pair of intermediate portions each provided with an inwardly extending recess, the edges of said recess portions being moved into engagement with both of the selected conductor elements when the pin is inserted into a selected opening, said intermediate portions being compressed when inserted into the selected opening to establish and maintain multiple point contact between each intermediate portion and both of the selected conductor elements.

3. A matrix panel arrangement as set forth in claim 2, wherein said inwardly extending recesses of said intermediate portion are defined by oppositely directed sloping shoulder portions the edges of which are positioned to contact the corresponding edges of the intersecting conductor elements adjacent the selected aligned openings.

References Cited

UNITED STATES PATENTS

| | | | |
|---|---|---|---|
| 318,929 | 5/1885 | Smith. | |
| 2,191,297 | 2/1940 | Olson | 339—252 |
| 2,921,240 | 1/1960 | Cole | 339—91 X |
| 2,945,205 | 7/1960 | Dierstein | 339—252 X |
| 3,230,297 | 1/1966 | Means | 339—17 X |
| 3,353,138 | 11/1967 | Loose | 339—18 |

FOREIGN PATENTS

| | | |
|---|---|---|
| 778,414 | 7/1957 | Great Britain. |

MARVIN A. CHAMPION, Primary Examiner

J. H. McGLYNN, Assistant Examiner

U.S. Cl. X.R.

339—252